(12) United States Patent
Lei et al.

(10) Patent No.: US 10,136,055 B2
(45) Date of Patent: Nov. 20, 2018

(54) METHOD FOR STITCHING TOGETHER IMAGES TAKEN THROUGH FISHEYE LENS IN ORDER TO PRODUCE 360-DEGREE SPHERICAL PANORAMA

(71) Applicant: MULTIMEDIA IMAGE SOLUTION LIMITED, Dublin (IE)

(72) Inventors: Hua Lei, Hangzhou (CN); Jin Wang, Hangzhou (CN)

(73) Assignee: MULTIMEDIA IMAGE SOLUTION LIMITED, Dublin (IE)

( * ) Notice: Subject to any disclaimer, the term of this patent is extended or adjusted under 35 U.S.C. 154(b) by 157 days.

(21) Appl. No.: 15/223,389

(22) Filed: Jul. 29, 2016

(65) Prior Publication Data
US 2018/0035047 A1   Feb. 1, 2018

(51) Int. Cl.
| H04N 5/232 | (2006.01) |
| H04N 5/265 | (2006.01) |
| G02B 13/06 | (2006.01) |
| G06T 3/00 | (2006.01) |
| G06T 3/40 | (2006.01) |

(52) U.S. Cl.
CPC ......... H04N 5/23238 (2013.01); G02B 13/06 (2013.01); G06T 3/0018 (2013.01); G06T 3/4038 (2013.01); H04N 5/265 (2013.01); G06T 2207/20221 (2013.01)

(58) Field of Classification Search
CPC .......... G02B 13/06; G06T 2207/20221; G06T 3/0018; H04N 5/23238; H04N 5/265
See application file for complete search history.

(56) References Cited

U.S. PATENT DOCUMENTS

| 8,368,762 | B1 * | 2/2013 | Chen ................ | H04N 17/002 348/187 |
| 2008/0012850 | A1 * | 1/2008 | Keating, III ....... | H04N 13/0207 345/419 |
| 2009/0052050 | A1 * | 2/2009 | Kweon ............... | G02B 13/06 359/668 |
| 2011/0141300 | A1 * | 6/2011 | Stec .................... | G06L 3/4038 348/222.1 |
| 2015/0116691 | A1 * | 4/2015 | Likholyot .......... | G01S 17/89 356/4.01 |

* cited by examiner

Primary Examiner — Anner N Holder
(74) Attorney, Agent, or Firm — Bacon & Thomas, PLLC

(57) ABSTRACT

The present invention is to provide a method for enabling an electronic device to read at least two images taken from different positions by a digital camera mounted with a fisheye lens; acquire internal and external parameters of the fisheye lens corresponding to the different positions as well as the vignetting coefficient for eliminating the vignetting on the images; perform exposure compensation and color calibration on the images for letting them have consistent brightness and hues; project the images onto a spherical surface and spread out the spherical surface to form a two-dimensional spread-out picture based on the parameters; register the overlapped images projected on the two-dimensional spread-out picture and adjust the offset of corresponding pixels thereof, register and adjust the brightness and hues of the overlapped images into consistency; and fuse overlapped images together to produce a 360-degree spherical panorama without having any noticeable stitching seam between the images.

15 Claims, 9 Drawing Sheets

METHOD FOR STITCHING TOGETHER IMAGES TAKEN THROUGH FISHEYE LENS IN ORDER TO PRODUCE 360-DEGREE SPHERICAL PANORAMA

FIELD OF THE INVENTION

The present invention relates to an image processing method, more particularly to a method for stitching together images taken through a fisheye lens in order to produce a 360-degree spherical panorama without having any noticeable stitching seam between the images.

BACKGROUND OF THE INVENTION

Recently, with the improvement of economic conditions, many people have had the means to travel abroad to see the longed-for landscapes with their own eyes and take pictures of the beauty in sight with the smartphones or digital still cameras they carry with them as a souvenir to remember the scenery by. However, a series of photos taken of the same site can never compare to a "panoramic photo", which can record the grandeur of a magnificent view more realistically than separate photos.

As smartphones and digital still cameras become more and more affordable, there is almost no tourist without one. Thanks to the plethora of image editing software on the market, many people have also learned to combine a series of photos taken of the same site into a panoramic photo using such software, in order to show the indescribable beauty they witnessed on their journeys. Today, many smartphones and digital still cameras have a "panorama function" by which to take panoramic photos. A user only has to switch the smartphone or digital still camera at hand to the "panorama mode" and perform a "horizontal scanning" operation, and a panoramic photo will be produced via the image processing software installed in the smartphone or digital still camera. A panoramic photo thus produced, however, has poor image quality when magnified. The two main reasons are as follows. First, the images taken by a smartphone or digital still camera are in the JPG format and therefore far less delicate than those in the RAW format. Second, some smartphones and digital still cameras do not provide high image resolution, so the images they take do not include as many details as desired. If, therefore, a digital single-lens reflex camera is used to take high-quality photos of a scenic spot, and the photos are then rendered into a fine panoramic photo, the details of the latter photo must be overwhelming when viewed magnified. It is this kind of panoramic photos that deserve to be kept for a lifetime.

But how to produce such an overwhelming panoramic photo? It must be understood in the first place that a panoramic photo of high image quality is in fact an assembly of a number of photos. More specifically, a plurality of photos are taken horizontally and consecutively of the same scenic spot and then sequentially stitched together using suitable image editing software (e.g., Photoshop). Take a common digital single-lens reflex camera for example. As the view angle of the lens is generally 60 degrees, at least eight photos must be taken in order to produce a 360-degree panoramic photo of high image quality. Basically, the more photos are stitched together, the better the result. When producing a 360-degree panoramic photo, referring to FIG. 1, it is crucial that each constituent photo has an appropriate portion reserved as an "overlap area", and the larger the overlap area, the better the stitching result. This is especially true when a lens of a relatively short focal length (e.g., 18 mm, 28 mm, etc.) is used, for it is difficult to stitch together photos with a strong sense of perspective, and a more natural stitching result can be obtained in that case by taking more photos and making the overlap area as large as possible. To ensure that a 360-degree panoramic photo has high image quality, therefore, it is common practice to take more than ten or even dozens of photos of the same site in a horizontal and consecutive manner, then adjust the brightness and colors of each photo with suitable image editing software in order to achieve consistency in brightness and hue, then stitch together the overlap areas of each two adjacent photos with the image editing software, and finally trim the sides of the stitched-together photo with the cutting tool of the image editing software in order to obtain the desired high-quality 360-degree panoramic photo.

While the foregoing process of taking a series of photos horizontally and successively of the same site and stitching the photos together with image editing software is already a technique frequently used by a few professional photographers to make high-quality 360-degree panoramic photos, an amateur may, even under the guidance of a professional photographer, find it difficult to determine the number of photos to be taken and the size of the overlap areas, not to mention the complicated editing process that follows, including adjusting the brightness and colors of each photo, stitching the photos together, trimming the composite photo, and so on. It is truly a shame that only few people are capable of using image editing software to combine a series of photos taken horizontally and sequentially of a scenic spot into a 360-degree panoramic photo of high image quality.

Accordingly, the issue to be addressed by the present invention is to design a method for producing a panoramic photo by a stitching process, allowing a user to take at least two photos and then apply the stitching process to stitch the photos rapidly and precisely together to form a 360-degree panoramic photo of high image quality.

BRIEF SUMMARY OF THE INVENTION

It is an objective of the present invention to provide a method for stitching together images taken through a fisheye lens in order to produce a 360-degree spherical panorama. The method is applied to an electronic device (e.g., a smartphone, digital still camera, or computer) so that the electronic device can read at least two real-site images taken respectively from different positions by at least one digital still camera mounted with a fisheye lens in order to produce a 360-degree spherical panorama. According to the method, the electronic device acquires a plurality of parameters, or more particularly a plurality of internal parameters and an external parameter, of the fisheye lens that correspond to the different positions. The internal parameters are the focal lengths of the fisheye lens, the offset of the center of the fisheye lens, and the aberration coefficient of the fisheye lens. The external parameter, on the other hand, is the three-dimensional relationship of the different positions from which the real-site images are respectively taken through the fisheye lens. The electronic device also acquires the vignetting coefficient of the fisheye lens and compensates for the brightness of the real-site images according to the vignetting coefficient in order to eliminate the vignetting effect. In addition, the electronic device performs exposure compensation and color calibration on the real-site images in order for the real-site images to have consistent brightness and hues. Then, based on the internal and external parameters of the fisheye lens, the electronic device projects the real-site images onto a spherical surface and spreads out the spherical surface to form a two-dimensional spread-out picture. The electronic device registers the images in the overlap areas of the real-site images projected on the two-dimensional spread-out picture, acquires the image registration parameter of each corresponding pair of image sections of the overlap areas, then calculates the registration parameter of each corresponding pair of pixels in the overlap areas through an interpolation smoothing operation, and adjusts the offset of each corresponding pair of pixels according to the corresponding registration parameter in order for the images in the overlap areas to register. After that, the electronic device registers and adjusts the brightness and hues of the overlap areas of the real-site images projected on the two-dimensional spread-out picture. Once the brightness and hue adjustment values of each corresponding pair of image sections of the overlap areas are obtained, the electronic device adjusts the brightness and hues of the overlap areas of the real-site images through the interpolation smoothing operation to achieve consistency in brightness and hue. Lastly, the overlap areas of the real-site images are fused to eliminate any noticeable seam between the real-site images. A user, therefore, only has to take at least two real-site images with the digital still camera from different positions, and the electronic device will rapidly produce a high-quality, precise spherical panorama out of the real-site images taken through the fisheye lens, allowing the user to faithfully record the unspeakable beauty of a magnificent view.

BRIEF DESCRIPTION OF THE SEVERAL VIEWS OF THE DRAWINGS

The above and other objectives, as well as the technical features and effects, of the present invention can be better understood by referring to the following detailed description in conjunction with the accompanying drawings, in which.

DETAILED DESCRIPTION OF THE INVENTION

As is well known in the art, a high-end digital single-lens reflex camera can be mounted with a fisheye lens to widen the view angle of the existing lens. Generally, a fisheye lens has a view angle greater than 180 degrees; that is to say, if a digital single-lens reflex camera mounted with a fisheye lens takes two images of a scenic spot in opposite directions respectively, each image taken will have more than a hemispheric field of view, which allows the images to capture a complete spherical view of the scenic spot.

Figure 1:
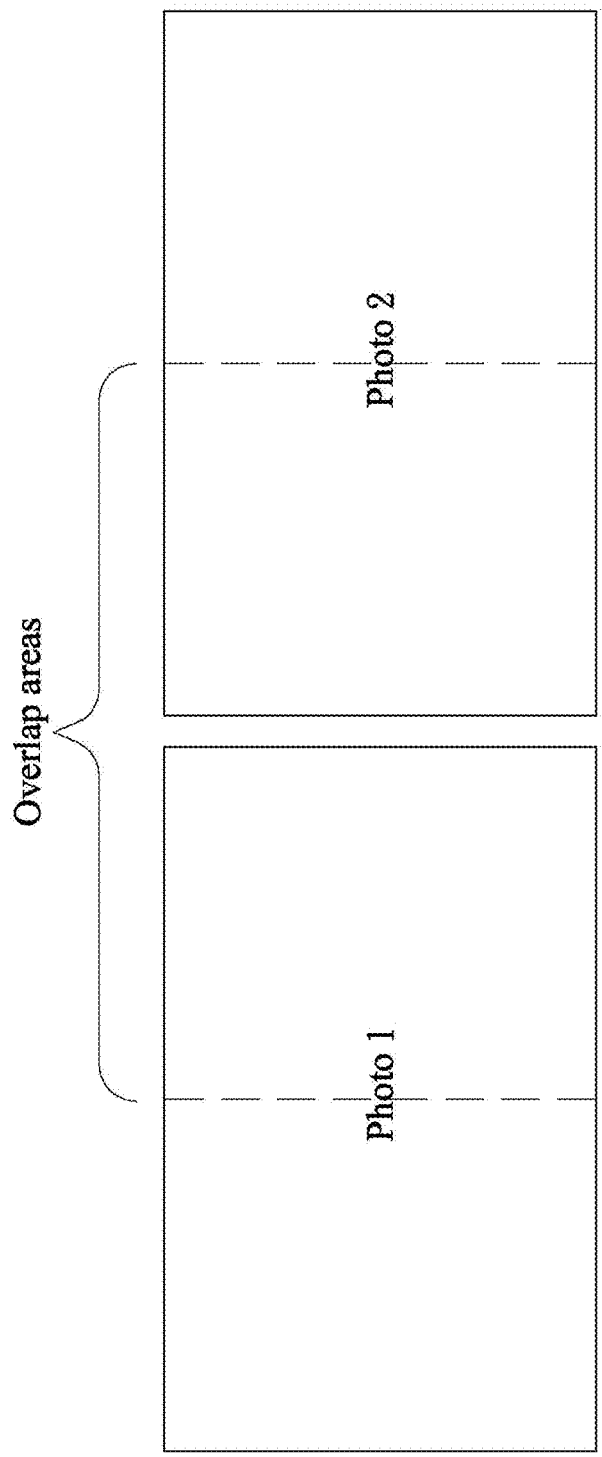
FIG. 1 schematically shows how photos are stitched together in a conventional manner.
Figure 2:
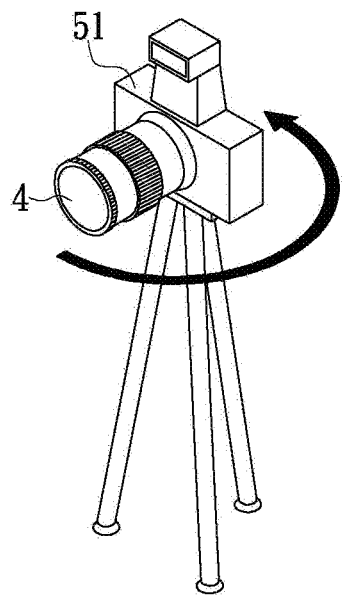
FIG. 2 schematically shows how two real-site images are taken by a digital still camera according to the present invention.

Based on the image-taking principle stated above, the inventor of the present invention developed a method for stitching together images taken through a fisheye lens in order to produce a 360-degree spherical panorama. The method is applied to an electronic device such as a smartphone, digital still camera, or computer, in order for the electronic device to read at least two real-site images taken respectively from different positions by at least one digital still camera mounted with a fisheye lens. As previously mentioned, a fisheye lens has a view angle greater than 180 degrees, so it only takes at least two real-site images captured through a fisheye lens to produce a 360-degree spherical panorama. In the present invention, real-site images can be obtained by either of the following two approaches:

(1) Referring to FIG. 2, only one digital still camera 5 mounted with a fisheye lens 4 is used. The digital still camera 5 is fixed at a certain position to take the first real-site image. Then, rotated by 180 degrees to the opposite direction without changing its horizontal position, the digital still camera 5 takes the second real-site image.

Figure 3:
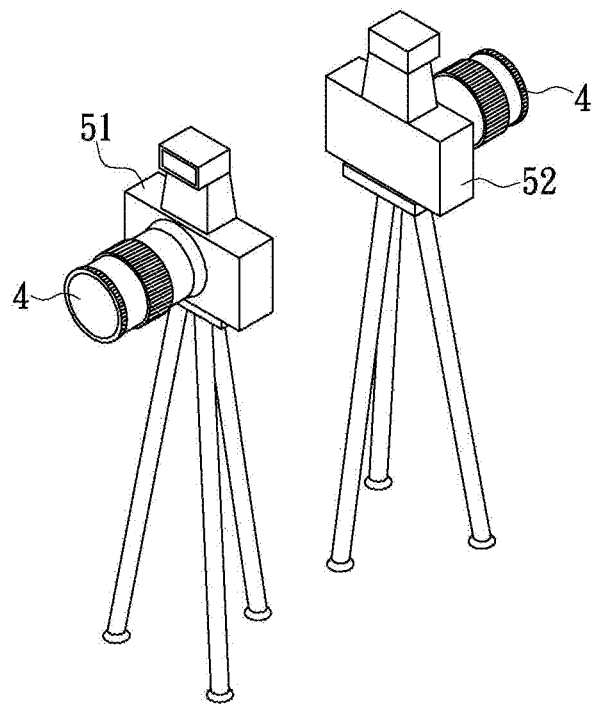
FIG. 3 schematically shows how two real-site images are taken respectively by two digital still cameras according to the present invention.

(2) Referring to FIG. 3, two digital still cameras 51, 52, each mounted with a fisheye lens 4, are used. The digital still cameras 51, 52 are so fixed that they face opposite directions, and two real-site images are taken at the same time by the two digital still cameras 51, 52 respectively.

In either case, the two real-site images taken of a scenic spot through the fisheye lens/lenses 4 facing opposite directions contain a 360-degree spherical panorama of the spot. These two approaches, however, are only the relatively easy ones for use in the present invention; other approaches may be used instead. For instance, a digital still camera mounted with a plurality of (e.g., four) fisheye lenses can be used to take four real-site images of a scenic spot sequentially in different directions, wherein three of the fisheye lenses are spaced apart from each other by 120 degrees and, facing downward, take three real-site images respectively, and wherein the other fisheye lens faces upward and takes the fourth real-site image.

Figure 4:
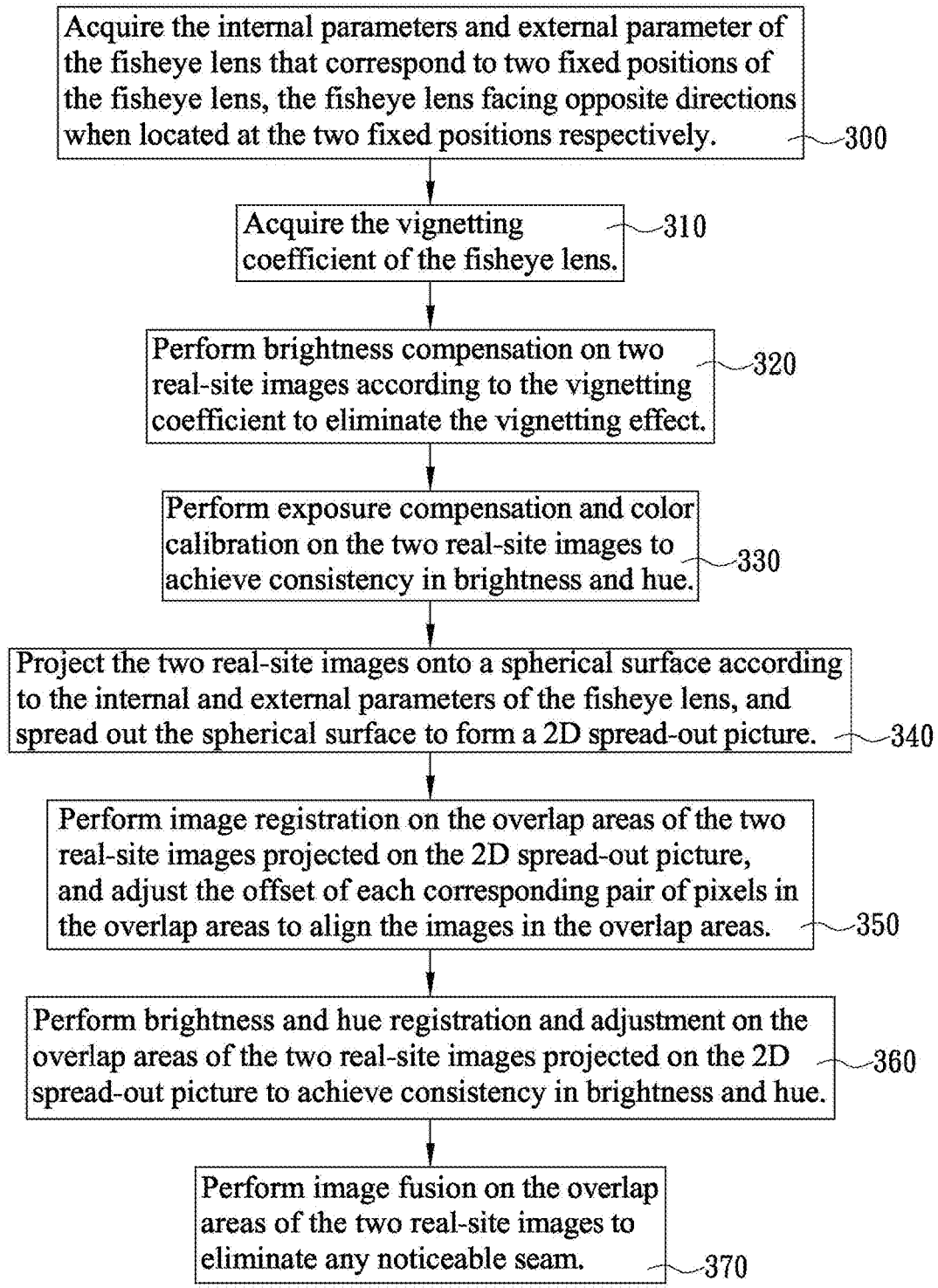
FIG. 4 is the flowchart of the present invention.
Figure 5:
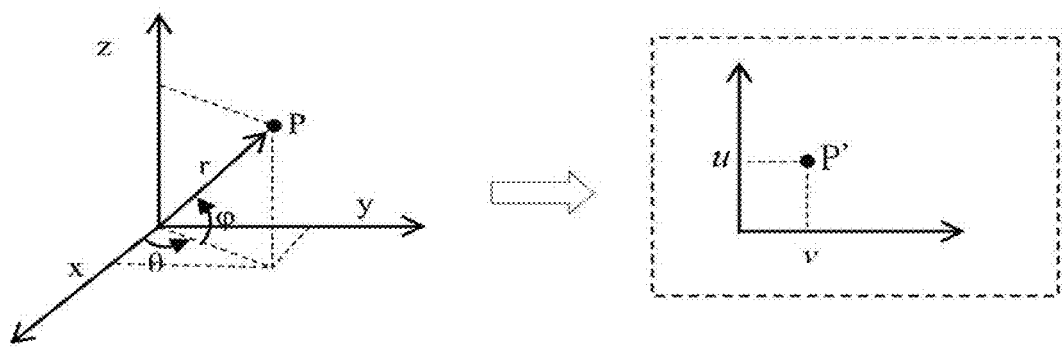
FIG. 5 shows the imaging principle of a fisheye lens and a schematic drawing of the mapping relationship between two coordinate systems.
Figure 6:
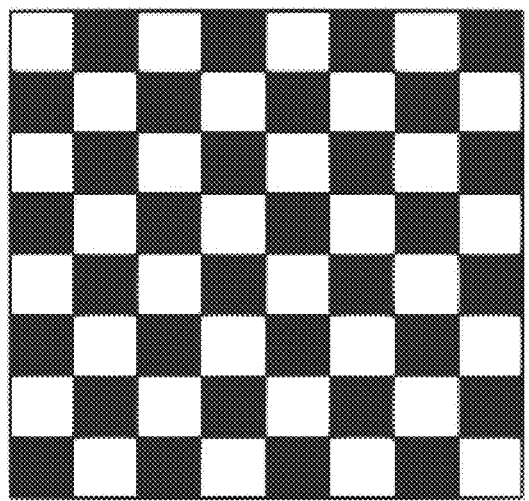
FIG. 6 schematically shows a checkerboard calibration plate.
Figure 7:
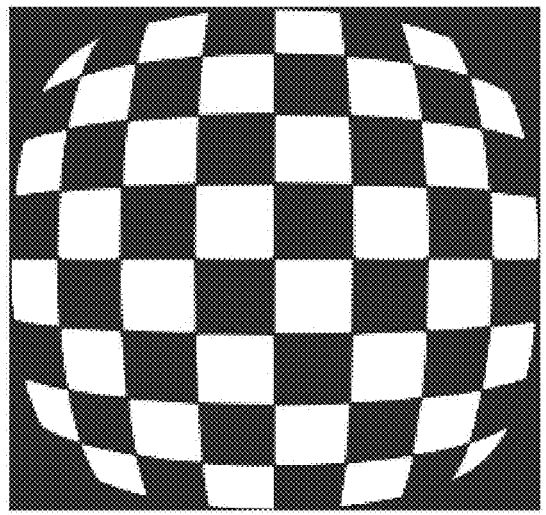
FIG. 7 is an image of a checkerboard calibration plate taken through a fisheye lens.

Hereinafter, a preferred embodiment of the present invention is detailed, using the foregoing first image-taking approach by way of example. According to the method of the present invention, the electronic device to which the method is applied performs the following steps (see FIG. 4) on the two real-site images obtained in order to produce a 360-degree spherical panorama:

(300) The electronic device acquires a plurality of parameters of the fisheye lens 4 that correspond to the two fixed positions from which the real-site images are respectively taken through the fisheye lens 4 and at which the fisheye lens 4 faces opposite directions respectively. The parameters include a plurality of internal parameters and an external parameter, as explained below. Referring to FIG. 5, the fisheye lens 4 images in such a way that a point P in a three-dimensional space, or more particularly the point $\overline{X}(X,Y,Z)$, is projected to a point $\overline{U}(u,v)$ in a two-dimensional imaging plane to form a pixel P' in a two-dimensional image, wherein the relationship between the two coordinate systems (hereinafter referred to as the projection-based relationship) can be expressed by the equations:

$$\begin{pmatrix} x \\ y \\ z \\ 1 \end{pmatrix} = M \begin{pmatrix} X \\ Y \\ Z \\ 1 \end{pmatrix}$$

$$r^2 = x^2 + y^2$$

$$\theta = \operatorname{atan}(r)$$

$$\theta' = (1 + k_1\theta^2 + k_2\theta^4 + k_3\theta^6 + k_4\theta^8)\theta$$

$$x' + (x(\theta')/r)$$

$$y' + (y(\theta')/r)$$

$$u = f_x x' + c_x$$

$$v = f_y y' + c_y$$

where: M represents the external parameter of the fisheye lens 4 and can be expressed by a rotation matrix to show the three-dimensional relationship between the different spatial positions from which the real-site images are respectively taken through the fisheye lens 4; and $f_x$, $f_y$ (focal lengths), $c_x$, $c_y$ (offsets of the lens center), and $k_i$(aberration coefficient) are internal parameters of the fisheye lens 4. The above equations can be simplified into the following function:

$$\overline{U}(u,v)=f(L,M\overline{X})$$

where: L represents the internal parameters of the fisheye lens 4, and f represents the projection-based relationship. The internal parameters can be acquired by photographing a plurality of calibration plates (e.g., the checkerboard calibration plate shown in FIG. 6) respectively placed at different positions. More specifically, the calibration plates are fixed at four (or six) inner walls of a light box respectively while the digital still camera 5 is positioned at the center of the light box to take images of the calibration plates. The images taken of the calibration plates (as shown in FIG. 7) are then registered, and the internal parameters of the fisheye lens 4 can be obtained through an optimization algorithm such as gradient descent, conjugate gradient, or Levenberg-Marquardt. As such algorithms are not a technical feature of the present invention, no further description is given herein. In $\overline{U}(u,v)=f(L,M\overline{X})$, which defines the imaging property of the fisheye lens 4, $\overline{X}$ can be regarded as a known quantity because each lattice point on the checkerboard calibration plates can be given specific coordinates in the light box space. $\overline{U}$, too, can be viewed as a known quantity because the coordinates of each checkerboard lattice point on a calibration plate can also be obtained through a lattice point detection algorithm. Thus, the internal parameters and the external parameter of the fisheye lens 4 can be determined by the steps of:

(301) setting an initial external parameter $M_0$;

(302) constructing an error function $E=\Sigma_i|\overline{U}_i-f(L, M_0X_i)|^2$, where i is the index of a lattice point;

(303) finding the internal parameters $L=L_k$ through the aforesaid optimization algorithm in order for the error function E to have a minimum value;

(304) substituting $L_k$, which is now a known quantity, into the error function E such that $E=\Sigma_i|\overline{U}_i-f(L_k, MX_i)|^2$, and then finding the external parameter $M=M_k$ through the optimization algorithm in order for the error function E to have a minimum value;

(305) substituting $M_k$ for $M_0$ in the error function E; and (306) repeating steps (303) to (305) until the value of the error function E is smaller than or equal to a predetermined value.

Figure 8:
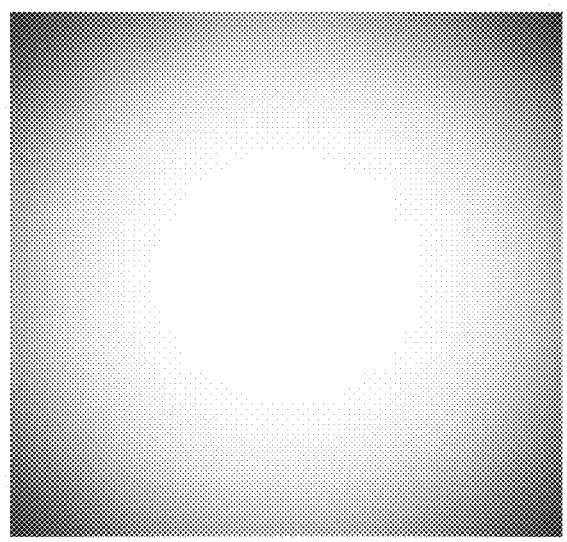
FIG. 8 is an image of a white plate taken through a fisheye lens.

(310) The electronic device acquires the vignetting coefficient of the fisheye lens 4. Fisheye lenses are known to form vignetted images, meaning the images become less bright in areas farther from the optical axis. In the present invention, the vignetting coefficient of the fisheye lens 4 is derived from an image (see FIG. 8) taken by the digital still camera 5 of a white plate with uniform illuminance.

(320) The electronic device applies the vignetting coefficient to compensate for the brightness of the two real-site images, thereby eliminating the vignetting effect.

(330) The electronic device conducts exposure compensation and color calibration on the two real-site images so that the two real-site images are consistent in brightness and hue.

(340) Based on the internal parameters and the external parameter of the fisheye lens 4, the electronic device projects the two real-site images, either in whole or in part (e.g., only the overlap areas of the images), onto a spherical surface. The spherical surface can be subsequently spread out to form a two-dimensional spread-out picture (also referred to as a "spread-out spherical picture") if needed. It should be pointed out that the stitching operation and fusing operation described further below for producing a 360-degree spherical panorama can be performed on the spherical surface as well as the two-dimensional spread-out picture. Generally speaking, the spherical surface is spread out according to its latitudes and longitudes in order to form the two-dimensional spread-out picture. Referring again to FIG. 5, assume the spherical surface has a radius r and includes a point P whose three-dimensional coordinates are (x,y,z), where $x^2+y^2+z^2=r^2$. Then, $P^1(\theta,\varphi)$ is the point in the two-dimensional spread-out picture that corresponds to the point $P^1$(x, y,z) in the spherical surface, where $\theta=\operatorname{atan}(y,x)$ and $\varphi=\operatorname{atan}(z,\sqrt{x^2+y^2})$. Conversely, P(x,y,z) can be derived from $P^1(\theta,\varphi)$ according to the following equations:

$$x = r \cos\varphi \cos\theta$$

$$y = r \cos\varphi \sin\theta$$

$$z = r \sin\varphi.$$

Let $\Gamma$ represent the mapping relationship between the coordinate system of the spherical surface and the coordinate system of the two-dimensional spread-out picture. The foregoing equations can be simplified into:

$$P(x,y,x)=\Gamma(P'(\theta,\varphi)).$$

Thus, the relationship defining how coordinates of the imaging plane of the fisheye lens 4 are mapped to coordinates of the two-dimensional spread-out picture can be expressed as follows:

$$\overline{U}(u,v)=f(L,MP(x,y,x))=f(L,M\Gamma(P'(\theta,\varphi))).$$

Figure 9:
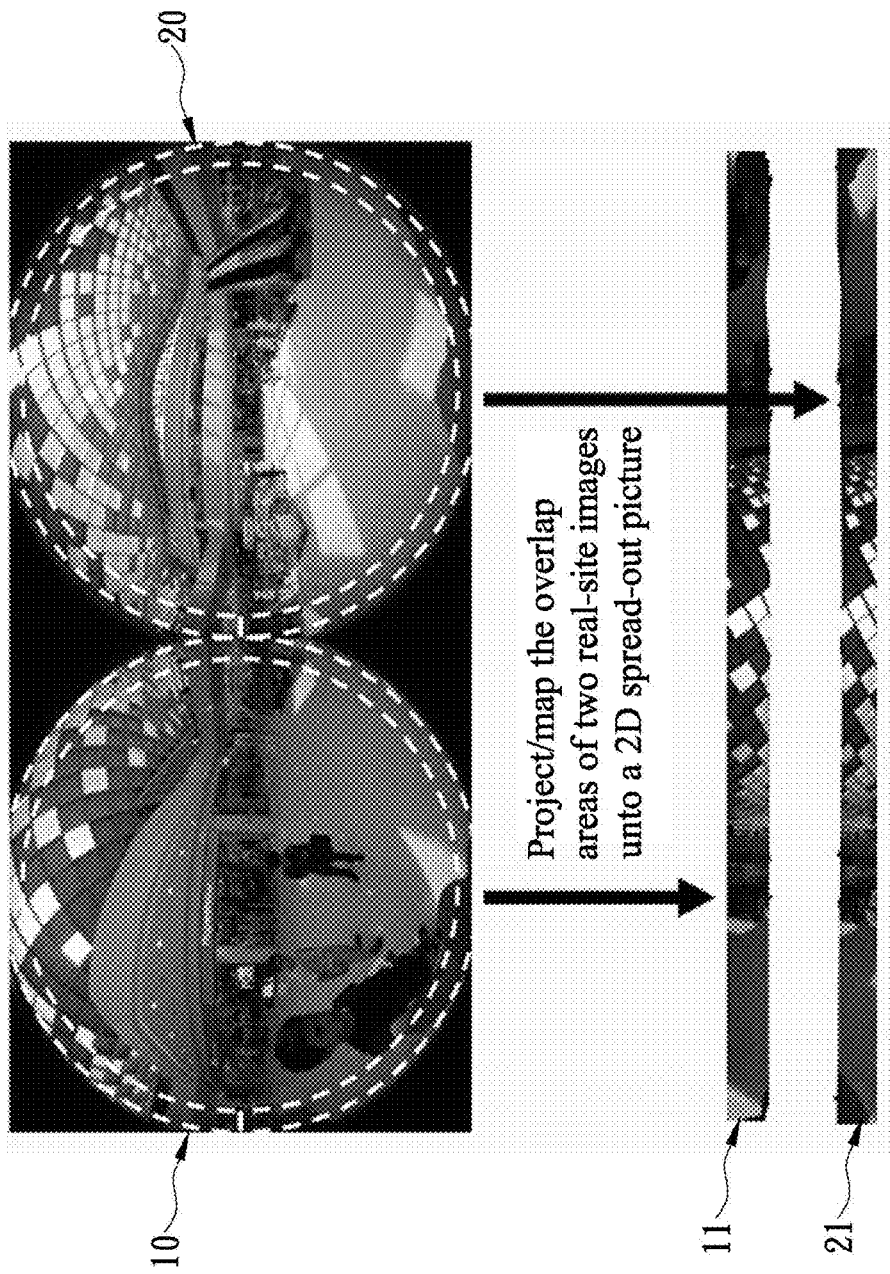
FIG. 9 schematically shows how the overlap areas of two real-site images are projected onto a two-dimensional spread-out picture according to the present invention.
Figure 10:
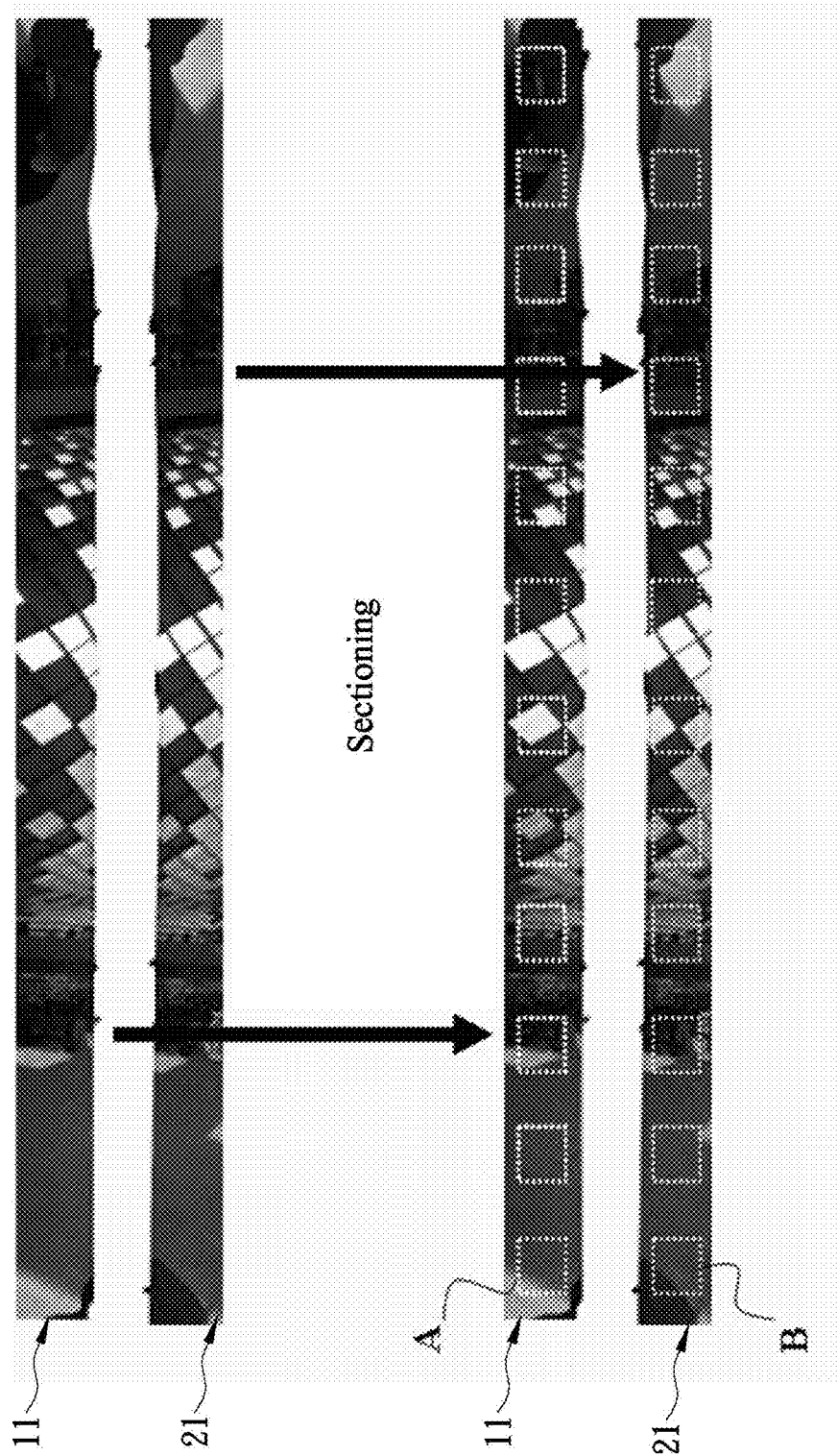
FIG. 10 schematically shows how the present invention sections the overlap areas of two real-site images after the overlap areas are projected onto a two-dimensional spread-out picture.
Figure 11:
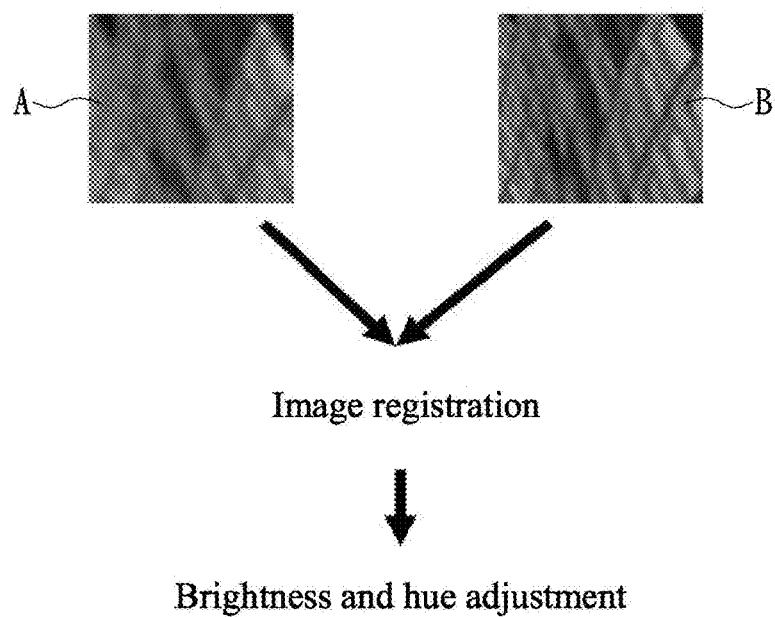
FIG. 11 schematically shows how the present invention registers the images in the overlap areas of two real-site images and adjusts the brightness and hues of the overlap areas after the overlap areas are projected onto a two-dimensional spread-out picture.

(350) Referring to FIG. 9, the electronic device projects the overlap areas of the two real-site images 10, 20 (e.g., the area between the dashed lines of either real-site image in FIG. 9) onto the two-dimensional spread-out picture according to either of the aforesaid mapping relationships and performs image registration on the overlap areas 11, 21 on the two-dimensional spread-out picture. Due to parallax as well as errors that are bound to exist in the internal parameters and the external parameter of the fisheye lens 4, it is very likely that the projected overlap areas 11, 21 of the two real-site images do not align perfectly. For example, referring to FIG. 10, image sections A and image sections B pertain to the overlap areas 11, 21 of the two real-site images respectively and have substantially the same image contents except for slight offsets between each corresponding pair of image sections. It is therefore necessary to align the image contents of the overlap areas through an image registration algorithm either for matching characteristic points or for matching image sections. First of all, whole-area registration is conducted, meaning the images in the overlap areas 11, 21 of the two real-site images are registered as a whole. Next, the overlap areas 11, 21 are respectively sectioned into small image sections A and B of 128×128 or 256×256 pixels (e.g., the dashed-line squares in FIG. 10), and images in each corresponding pair of image sections A and B are registered as shown in FIG. 11. Once the image registration parameter of each corresponding pair of image sections A and B are obtained, an interpolation smoothing operation is applied to calculate the registration parameter of each corresponding pair of pixels, and the offset between each corresponding pair of pixels is adjusted according to the registration parameter in order for the images in the overlap areas 11, 21 to register.

(360) With continued reference to FIG. 11, the electronic device performs brightness and hue registration and adjustment on the overlap areas 11, 21 projected on the two-dimensional spread-out picture. More specifically, the differences in brightness and color between each corresponding pair of image sections A and B are determined, and then the brightness and colors of each corresponding pair of image sections A and B are adjusted according to the differences determined so that the overlap areas 11, 21 of the two real-site images are consistent in brightness and hue. Take the image sections A and B in FIG. 11 for example. These two image sections A and B pertain to the overlap areas 11, 21 of the two real-site images respectively and have substantially the same image contents except for differences in brightness and hue. To register the brightness and hues of the image sections A and B, brightness and hue registration algorithms are required. The brightness registration algorithm calculates the average brightness values $\overline{I_A}$ and $\overline{I_B}$ of the image sections A and B respectively and sets the target average brightness value $I_{AB}$ of the image sections A and B as $$I_{AB} = \frac{\overline{I_A} + \overline{I_B}}{2},$$

meaning the adjustments to be made to the brightness of the image sections A and B are $\Delta I_A = I_{AB} - \overline{I_A}$ and $\Delta I_B = I_{AB} - \overline{I_B}$ respectively. Alternatively, the target average brightness value of the image sections A and B can be set as $$\beta_A = \frac{I_{AB}}{\overline{I_A}} \text{ and } \beta_B = \frac{I_{AB}}{\overline{I_B}}$$

and in that case the adjustments to be made to the brightness of the image sections A and B are $$I_{AB} = \sqrt{\overline{I_A}\overline{I_B}},$$

A and Bs respectively. Similar to the brightness registration algorithm, the hue registration algorithm is applied to the R, G, B color channels of each of the image sections A and B to obtain the corresponding hue adjustments. Once the brightness and hue adjustment values of each corresponding pair of image sections A and B are obtained, they are applied to the overlap areas 11, 21 of the two real-site images via an interpolation smoothing operation to achieve consistency in brightness and hue between the overlap areas 11, 21 of the two real-site images.

Figure 12:
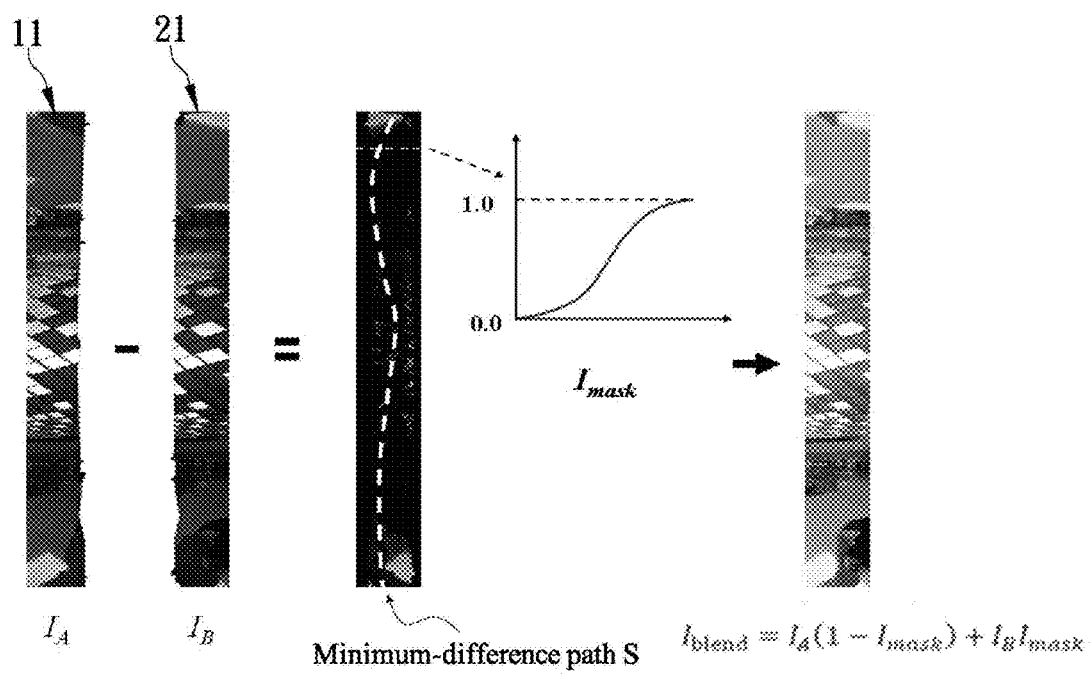
FIG. 12 schematically shows how the present invention fuses the images in the overlap areas of two real-site images after the overlap areas are projected onto a two-dimensional spread-out picture.

(370) The electronic device performs image fusion on the overlap areas 11, 21 of the two real-site images to eliminate any noticeable seam between the real-site images. Referring to FIG. 12, images $I_A$ and $I_B$ of the overlap areas 11, 21 are projected onto the two-dimensional spread-out picture through either of the aforesaid mapping relationships after image registration and brightness and color adjustment. The image fusion operation of the present invention is then conducted by calculating the difference diagram $\Delta I = abs(I_A - I_B)$ of the images $I_A$ and $I_B$, finding the minimum-difference path S in the difference diagram through a dynamic programming or graph cut algorithm, constructing a mask diagram $I_{mask}$, and fusing the images $I_A$ and $I_B$ through a linear fusion or Laplace pyramid fusion algorithm. The process of constructing the mask diagram $I_{mask}$ basically involves assigning the value 0.5 to each pixel on the minimum-difference path S such that the farther a pixel to the right of the minimum-difference path S is from the minimum-difference path S, the greater (or more particularly the closer to 1.0) the pixel's value. Similarly, the farther a pixel to the left of the minimum-difference path S is from the minimum-difference path S, the smaller (or more particularly the closer to 0.0) the pixel's value. Moreover, of the two fusion algorithms mentioned above, the linear fusion algorithm is the simpler and is carried out by weighting the to-be-fused images $I_A$ and $I_B$ with the mask diagram $I_{mask}$ and performing the following linear superimposition to form a fused image $I_{blend}$:

$$I_{blend} = I_A(1 - I_{mask}) + I_B I_{mask}.$$

The Laplace pyramid fusion algorithm, on the other hand, is a classic yet more complicated image fusion algorithm and works as follows:

(371) For each to-be-fused image $I_A$ or $I_B$, a Laplace pyramid $L_i(I_A)$ or $L_i(I_B)$ is constructed, where i indicates the $i^{th}$ layer of the pyramid. When i=0, $I_A = L_0(I_A)$ and $I_B = L_0(I_B)$.

(372) A Gaussian pyramid $G_i(I_{mask})$ is constructed for the mask diagram $I_{mask}$, where i indicates the $i^{th}$ layer of the pyramid.

(373) A Laplace pyramid $L_i(I_{blend})$ of the fused image $I_{blend}$ is calculated using $G_i(I_{mask})$ and the following equation:

$$L_i(I_{blend}) = L_i(I_A)(1 - G_i(I_{mask})) + L_i(I_B)G_i(I_{mask}).$$

(374) $I_{blend}$ is reconstructed from $L_i(I_{blend})$.

Figure 13:
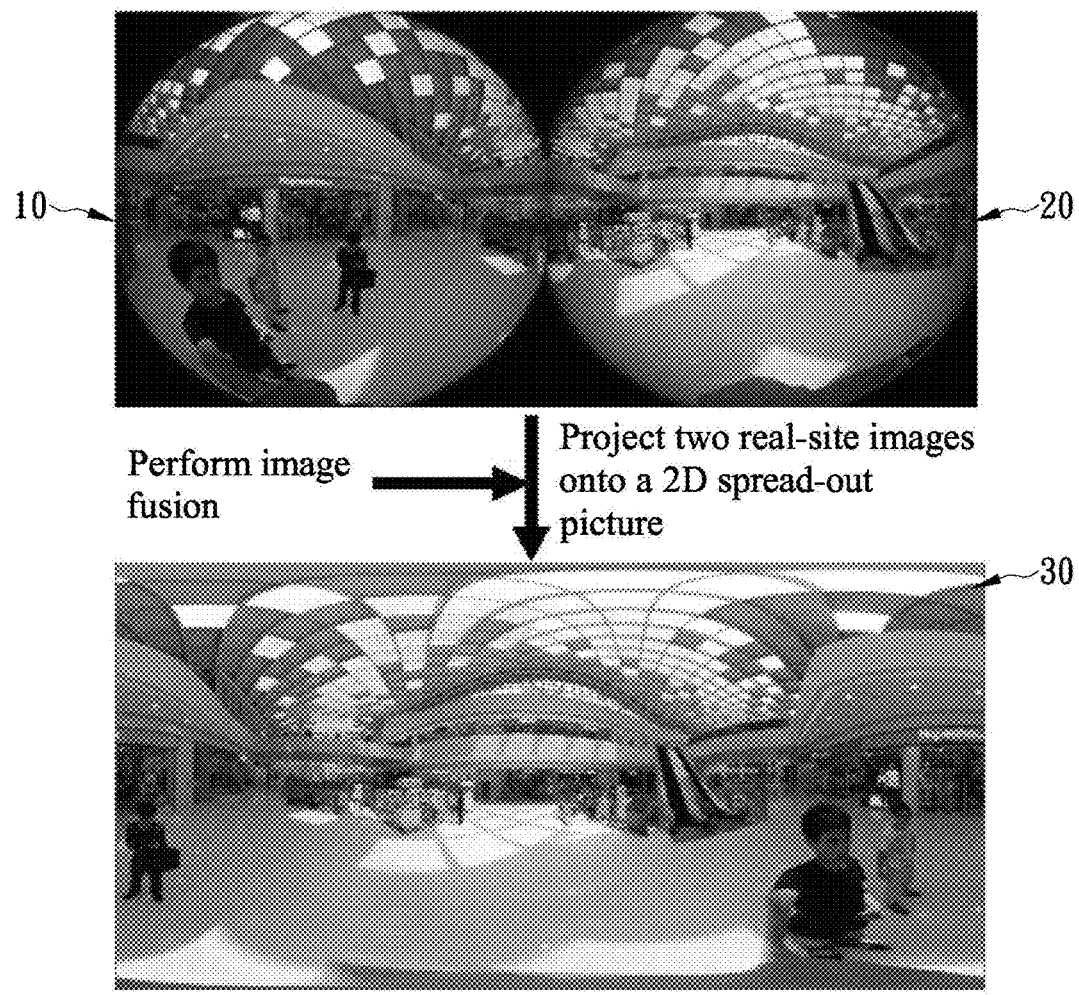
FIG. 13 schematically shows how the present invention projects two real-site images onto a two-dimensional spread-out picture and fuses the real-site images into a spherical panorama of high image quality.

Thus, one who is not highly skilled in photography or image editing but wishes to faithfully record the magnificence of a grand view can do so simply by taking two real-site images 10, 20 with the digital still camera 5 from two fixed positions where the digital still camera 5 faces opposite directions respectively. With the two real-site images 10, 20 taken through the fisheye lens 4, referring to FIG. 13, the electronic device will rapidly produce a precise spherical panorama 30 of high image quality.

In the preferred embodiment described above, the electronic device may be the digital still camera 5 itself. In that case, the method is a built-in procedure of the image processing software in the digital still camera 5. After the digital still camera 5 takes at least two real-site images 10, 20 from different positions respectively, the image processing software performs steps (300)~(370) to stitch the real-site images together rapidly and thereby produce the spherical panorama 30. It is understood that the electronic device is by no means limited to the digital still camera 5 and may alternatively be a smartphone, a computer, or the like. Whichever the case, once the digital still camera 5 takes at least two real-site images 10, 20 through the fisheye lens 4 from different positions respectively, the electronic device will, after acquiring the internal parameters, the external parameter, and the vignetting coefficient according to steps (300)~(310), connect with the digital still camera 5; read the real-site images 10, 20 as well as the internal parameters, the external parameter, and the vignetting coefficient; and stitch the real-site images 10, 20 together rapidly according to steps (320)~(370) to form the spherical panorama 30.

It should be pointed out that steps (301)~(306) are provided to determine the internal parameters and the external parameter of a single fisheye lens through which at least two real-site images are taken. If, in another embodiment of the present invention, the second image-taking approach described above is used to obtain at least two real-site images, and the two digital still cameras 51, 52 are mounted with different fisheye lenses 4 respectively, the internal parameters and the external parameters of those fisheye lenses 4 can be simultaneously determined through the following steps:

(401) The internal parameters and the external parameter of each fisheye lens 4 are initialized.

(402) An overall error function is constructed as $$E = \sum_n E_n,$$

where $E_n$ is the individual error function of the $n^{th}$ fisheye lens 4.

(403) The internal and external parameters of each fisheye lens 4 are determined by the foregoing process for determining the internal and external parameters of a single fisheye lens 4 (i.e., steps (301)~(306)), using the known initial quantities of the internal and external parameters of each fisheye lens 4.

(404) Step (403) is repeated until the internal and external parameters of all the fisheye lenses 4 are obtained.

(405) Steps (403) and (404) are repeated until the value of the overall error function E is smaller than or equal to a predetermined value.

Furthermore, if in the foregoing embodiment of the present invention, the position of the digital still camera or the positions of the calibration plates in the light box are unknown, only one variable $\tilde{M}$ is required to represent the spatial positions of the calibration plates so that $\tilde{M}_n X_i$ represents the physical-space coordinates of each lattice point on a calibration plate, where n indicates the $n^{th}$ calibration plate while $X_i$ represents the coordinates of the $i^{th}$ lattice point on that calibration plate, the origin of the coordinate system being the center of the calibration plate, with the x- and y-axes defining the plane of the calibration plate. The projection-based relationship associated with the fisheye lens 4 can therefore be expressed by the equation:

$$\overline{U}(u,v)=f(L,M\tilde{M}_n X_i)$$

where: $X_i$ and $\overline{U}$ are known quantities; and $\tilde{M}_n$, L, and M are unknown. $\tilde{M}_n$, L, and M can be determined in a similar way to the internal and external parameters of a single fisheye lens or plural fisheye lenses.

While the invention herein disclosed has been described by means of specific embodiments, numerous modifications and variations could be made thereto by those skilled in the art without departing from the scope of the invention set forth in the claims.

What is claimed is:

1. A method for stitching together images taken through a fisheye lens in order to produce a 360-degree spherical panorama, wherein the method is applied to an electronic device so that the electronic device is enabled to read at least two real-site images taken respectively from different positions by at least one digital still camera mounted with a fisheye lens, the method comprising the steps, to be performed by the electronic device, of:

acquiring a plurality of parameters of the fisheye lens that correspond to the different positions, the parameters comprising a plurality of internal parameters and an external parameter, wherein the internal parameters are focal lengths of the fisheye lens, an offset of a center of the fisheye lens, and an aberration coefficient of the fisheye lens, and the internal parameters are acquired by taking images of a plurality of calibration plates respectively placed on different inner walls of a light box, registering the images taken of the calibration plates, and determining the internal parameters through an optimization algorithm; and the external parameter is a three-dimensional relationship between the different positions from which the real-site images are respectively taken through the fisheye lens; and wherein the fisheye lens has an imaging property defined by $\overline{U}(u,v)=f(L,M\overline{X})$ describing how a point $\overline{X}(X,Y,Z)$ in a three-dimensional space is projected to a point $\overline{U}(u,v)$ in a two-dimensional imaging plane of the fisheye lens to form a pixel in a two-dimensional image, with M representing the external parameter of the fisheye lens, L representing the internal parameters of the fisheye lens, f representing a projection-based relationship, and $\overline{X}$ representing coordinates of lattice points of a checkerboard lattice on each said calibration plate;

acquiring a vignetting coefficient of the fisheye lens, and performing brightness compensation on the real-site images according to the vignetting coefficient in order to eliminate a vignetting effect;

projecting the real-site images onto a spherical surface according to the internal parameters and the external parameter, and spreading out the spherical surface to form a two-dimensional spread-out picture;

performing image registration on overlap areas of the real-site images projected on the two-dimensional spread-out picture, calculating a registration parameter of each corresponding pair of pixels in the overlap areas through an interpolation smoothing operation after obtaining an image registration parameter of each corresponding pair of image sections of the overlap areas, and adjusting an offset of each corresponding pair of said pixels in the overlap areas according to a corresponding said registration parameter in order to align images in the overlap areas;

performing brightness and hue registration and adjustment on the overlap areas of the real-site images projected on the two-dimensional spread-out picture, calculating brightness and hue adjustment values for each corresponding pair of said image sections, and adjusting brightness and hues of the overlap areas of the real-site images according to the brightness and hue adjustment values through an interpolation smoothing operation in order to achieve consistency in brightness and hue; and performing image fusion on the overlap areas of the real-site images to eliminate any noticeable seam and thereby produce a 360-degree spherical panorama.

2. The method of claim 1, further comprising the step, to be performed by the electronic device prior to projecting the real-site images onto the spherical surface and spreading out the spherical surface to form the two-dimensional spread-out picture, of performing exposure compensation and color calibration on the real-site images in order to achieve consistency in brightness and hue of the real-site images.

3. The method of claim 2, wherein the external parameter is a rotation matrix defining the three-dimensional relationship between the different positions from which the real-site images are respectively taken through the fisheye lens.

4. The method of claim 1, further comprising the steps, to be performed by the electronic device in order to acquire the internal parameters and the external parameter, of:

setting an initial external parameter $M_0$;

constructing an error function $E=\Sigma_i|\overline{U}_i-f(L,M_0X_i)|^2$, where i is an index of a said lattice point;

finding $L=L_k$ with an optimization algorithm in order for the error function E to have a minimum value;

substituting $L_k$ into the error function E such that $E=\Sigma_i|\overline{U}_i-f(L_k,MX_i)|^2$, and finding $M=M_k$ with the optimization algorithm in order for the error function E to have a minimum value;

substituting $M_k$ for $M_0$ in the error function E; and repeating the immediately preceding three steps until the error function E has a value smaller than or equal to a predetermined value.

5. The method of claim 1, further comprising the steps, to be performed by the electronic device in order to acquire the internal parameters and the external parameter, of:

setting an initial external parameter $M_0$;

constructing an error function $E=\Sigma_i|\overline{U}_i-f(L,M_0X_i)|^2$, where i is an index of a said lattice point;

finding $L=L_k$ with an optimization algorithm in order for the error function E to have a minimum value;

substituting $L_k$ into the error function E such that $E=\Sigma_i|\overline{U}_i-f(L_k,MX_i)|^2$, and finding $M=M_k$ with the optimization algorithm in order for the error function E to have a minimum value;

substituting $M_k$ for $M_0$ in the error function E; and repeating the immediately preceding three steps until the error function E has a value smaller than or equal to a predetermined value.

6. The method of claim 1, further comprising the steps, to be performed by the electronic device in order to acquire the internal parameters and the external parameter, of:

setting an initial external parameter $M_0$;

constructing an error function $E=\Sigma_i|\overline{U}_i-f(L,M_0X_i)|^2$, where is an index of a said lattice point;

finding $L=L_k$ with an optimization algorithm in order for the error function E to have a minimum value;

substituting $L_k$ into the error function E such that $E=\Sigma_i|\overline{U}_i-f(L_k,MX_i)|^2$, and finding $M=M_k$ with the optimization algorithm in order for the error function E to have a minimum value;

substituting $M_k$ for $M_0$ in the error function E; and repeating the immediately preceding three steps until the error function E has a value smaller than or equal to a predetermined value.

7. The method of claim 4, wherein the spherical surface is spread out according to latitudes and longitudes thereof to form the two-dimensional spread-out picture; the spherical surface has a radius r such that a point $P(x,y,z)$ in the spherical surface, with $x^2+y^2+z^2=r^2$, corresponds to a point $P^1(\theta,\varphi)$ in the two-dimensional spread-out picture, with $\theta=\text{atan}(y,x)$ and $\varphi=\text{atan}(z,\sqrt{x^2+y^2})$; $P(x,y,z)$ and $P^1(\theta,\varphi)$ have a relationship defined by:

$$P(x,y,x)=\Gamma(P'(\theta,\varphi)),$$

where $\Gamma$ represents a mapping relationship between a coordinate system of the spherical surface and a coordinate system of the two-dimensional spread-out picture; and a mapping relationship between the coordinate system of the two-dimensional spread-out picture and a coordinate system of the imaging plane of the fisheye lens is therefore defined as:

$$\overline{U}(u,v)=f(L,MP(x,y,x))=f(L,M\Gamma(P'(\theta,\varphi))).$$

8. The method of claim 5, wherein the spherical surface is spread out according to latitudes and longitudes thereof to form the two-dimensional spread-out picture; the spherical surface has a radius r such that a point $P(x,y,z)$ in the spherical surface, with $x^2+y^2+z^2=r^2$, corresponds to a point $P^1(\theta,\varphi)$ in the two-dimensional spread-out picture, with $\theta=\text{atan}(y,x)$ and $\varphi=\text{atan}(z,\sqrt{x^2+y^2})$; $P(x,y,z)$ and $P^1$ $(\theta,\varphi)$ have a relationship defined by:

$$P(x,y,z)=\Gamma)P'(\theta,\varphi)),$$

where $\Gamma$ represents a mapping relationship between a coordinate system of the spherical surface and a coordinate system of the two-dimensional spread-out picture; and a mapping relationship between the coordinate system of the two-dimensional spread-out picture and a coordinate system of the imaging plane of the fisheye lens is therefore defined as:

$$\overline{U}(u,v)=f(L,MP(x,y,z))=f(L,M\Gamma(P'(\theta,\varphi))).$$

9. The method of claim 6, wherein the spherical surface is spread out according to latitudes and longitudes thereof to form the two-dimensional spread-out picture; the spherical surface has a radius r such that a point $P(x,y,z)$ in the spherical surface, with $x^2+y^2+z^2=r^2$, corresponds to a point $P^1(\theta,\varphi)$ in the two-dimensional spread-out picture, with $\theta=\text{atan}(y,x)$ and $\varphi=\text{atan}(z,\sqrt{x^2+y^2})$; $P(x,y,z)$ and $P^1(\theta,\varphi)$ have a relationship defined by:

$$P(x,y,z)=\Gamma(P'(\theta,\varphi)),$$

where $\Gamma$ represents a mapping relationship between a coordinate system of the spherical surface and a coordinate system of the two-dimensional spread-out picture; and a mapping relationship between the coordinate system of the two-dimensional spread-out picture and a coordinate system of the imaging plane of the fisheye lens is therefore defined as:

$$\overline{U}(u,v)=f(L,MP(x,y,x))=f(LM\Gamma(P'(\theta,\varphi)).$$

10. The method of claim 7, wherein the image registration comprises the steps of:
performing whole-area registration by registering the images in the overlap areas of the real-site images projected on the two-dimensional spread-out picture as a whole;
sectioning the overlap areas to form the image sections; and
registering images in each corresponding pair of said image sections.

11. The method of claim 8, wherein the image registration comprises the steps of:
performing whole-area registration by registering the images in the overlap areas of the real-site images projected on the two-dimensional spread-out picture as a whole;
sectioning the overlap areas to form the image sections; and
registering images in each corresponding pair of said image sections.

12. The method of claim 9, wherein the image registration comprises the steps of:
performing whole-area registration by registering the images in the overlap areas of the real-site images projected on the two-dimensional spread-out picture as a whole;
sectioning the overlap areas to form the image sections; and
registering images in each corresponding pair of said image sections.

13. The method of claim 10, wherein the image fusion comprises the steps of:
projecting the overlap areas of the real-site images onto the two-dimensional spread-out picture according to either of the mapping relationships after images $I_A$ and $I_B$ in the overlap areas are subjected to image registration and brightness and color adjustment;
calculating a difference diagram $\Delta I=abs(I_A-I_B)$ of the images $I_A$ and $I_B$;
finding a minimum-difference path in the difference diagram; and
constructing a mask diagram $I_{mask}$, weighting the images $I_A$ and $I_B$ with the mask diagram $I_{mask}$, and fusing the weighted images $I_A$ and $I_B$.

14. The method of claim 11, wherein the image fusion comprises the steps of:
projecting the overlap areas of the real-site images onto the two-dimensional spread-out picture according to either of the mapping relationships after images $I_A$ and $I_B$ in the overlap areas are subjected to image registration and brightness and color adjustment;
calculating a difference diagram $\Delta I=abs(I_A-I_B)$ of the images $I_A$ and $I_B$;
finding a minimum-difference path in the difference diagram; and
constructing a mask diagram $I_{mask}$, weighting the images $I_A$ and $I_B$ with the mask diagram $I_{mask}$, and fusing the weighted images $I_A$ and $I_B$.

15. The method of claim 12, wherein the image fusion comprises the steps of:
projecting the overlap areas of the real-site images onto the two-dimensional spread-out picture according to either of the mapping relationships after images $I_A$ and $I_B$ in the overlap areas are subjected to image registration and brightness and color adjustment;
calculating a difference diagram $\Delta I=abs(I_A-I_B)$ of the images $I_A$ and $I_B$;
finding a minimum-difference path in the difference diagram; and
constructing a mask diagram $I_{mask}$, weighting the images $I_A$ and $I_B$ with the mask diagram $I_{mask}$, and fusing the weighted images $I_A$ and $I_B$.

* * * * *